(12) United States Patent
Brimmer et al.

(10) Patent No.: US 10,531,681 B2
(45) Date of Patent: Jan. 14, 2020

(54) HEAT-TRIGGERED COLORANTS AND METHODS OF MAKING AND USING THE SAME

(75) Inventors: Karen Brimmer, St. Louis, MO (US); Danny Thomas Lauff, Wildwood, MO (US); Olaf C. Moberg, New Brighton, MN (US); Christopher J. Rueb, St. Paul, MN (US); William A. Hendrickson, Stillwater, MN (US)

(73) Assignee: Sensient Colors LLC, St. Louis, MO (US)

( * ) Notice: Subject to any disclaimer, the term of this patent is extended or adjusted under 35 U.S.C. 154(b) by 817 days.

(21) Appl. No.: 12/429,735

(22) Filed: Apr. 24, 2009

(65) Prior Publication Data
US 2009/0269447 A1 Oct. 29, 2009

Related U.S. Application Data

(60) Provisional application No. 61/082,440, filed on Jul. 21, 2008, provisional application No. 61/048,074, filed on Apr. 25, 2008.

(51) Int. Cl.
*A23L 5/47* (2016.01)
*A23L 7/109* (2016.01)
(Continued)

(52) U.S. Cl.
CPC .................... *A23L 5/47* (2016.08)

(58) Field of Classification Search
CPC .......... A23L 1/16; A23L 1/1641; A23L 1/275; A23L 1/2751; A23L 1/2756; A23V 2200/04
(Continued)

(56) References Cited

U.S. PATENT DOCUMENTS

| 1,931,409 A | 10/1933 | Humphrey |
| 2,062,867 A | 12/1936 | Cosler |
(Continued)

FOREIGN PATENT DOCUMENTS

| CH | 660 750 | 6/1987 |
| CH | 662 358 | 9/1987 |
(Continued)

OTHER PUBLICATIONS

Pothakamury, et al, Fundamental aspects of controlled release in foods, Trends Food Sci. and Technol., 6 (1995), pp. 397-406.*
(Continued)

*Primary Examiner* — D. Lawrence Tarazano
*Assistant Examiner* — Philip A Dubois
(74) *Attorney, Agent, or Firm* — Michael Best & Friedrich LLP

(57) ABSTRACT

Heat-triggered colorants for altering the color of a food, methods for changing the color of a food using heat-triggered colorants, and methods for making heat-triggered colorants for food. The heat-triggered colorants may comprise a mixture comprising a carrier having a melting point and a GRAS (Generally Recognized as Safe) first food colorant having a color, and a coating encapsulating the mixture and masking the color of the first food colorant. When the heat-triggered colorant is exposed to a temperature greater than the melting point of the carrier, the carrier melts and releases the first food colorant, thereby unmasking the color of the first food colorant.

30 Claims, 2 Drawing Sheets

(51) Int. Cl.
*A23L 7/122* (2016.01)
*A23L 5/42* (2016.01)
*A23L 5/43* (2016.01)

(58) Field of Classification Search
USPC .......................................................... 426/250
See application file for complete search history.

(56) References Cited

U.S. PATENT DOCUMENTS

| | | | |
|---|---|---|---|
| 2,258,347 A | 10/1941 | Biggert, Jr. | |
| 2,385,613 A | 9/1945 | Davis | |
| 2,581,186 A | 1/1952 | Green | |
| 2,948,626 A | 8/1960 | Sanders, Jr. | |
| 2,982,234 A | 5/1961 | Ackley et al. | |
| 3,015,610 A | 1/1962 | Sanders, Jr. | |
| 3,052,552 A | 9/1962 | Koerner et al. | |
| 3,084,050 A | 4/1963 | Holland et al. | |
| 3,239,371 A | 3/1966 | Whitney et al. | |
| 3,258,347 A | 6/1966 | Brown | |
| 3,461,032 A | 8/1969 | Lichtenberger et al. | |
| 3,554,767 A | 1/1971 | Daum | |
| 3,592,940 A | 7/1971 | Quesada | |
| 3,677,691 A | 7/1972 | Koch | |
| 3,694,237 A | 9/1972 | Piotrowski | |
| 3,796,814 A | 3/1974 | Cermak | |
| 3,806,607 A | 4/1974 | Whelan | |
| 4,021,252 A | 5/1977 | Banczak et al. | |
| 4,112,125 A | 9/1978 | Chesnut et al. | |
| 4,167,422 A | 9/1979 | Bellanca et al. | |
| 4,168,662 A | 9/1979 | Fell | |
| 4,177,075 A | 12/1979 | Mansukhani | |
| 4,230,687 A | 10/1980 | Sair et al. | |
| 4,233,328 A | 11/1980 | Dawson et al. | |
| 4,239,543 A | 12/1980 | Beasley | |
| 4,250,327 A | 2/1981 | Dawson et al. | |
| 4,307,117 A | 12/1981 | Leshik | |
| 4,315,035 A * | 2/1982 | Basa .................. | A23L 5/42 426/250 |
| 4,316,918 A | 2/1982 | Bunes | |
| 4,327,077 A | 4/1982 | Puglia et al. | |
| 4,421,559 A | 12/1983 | Owatari | |
| 4,500,576 A | 2/1985 | Nicholson et al. | |
| 4,511,613 A | 4/1985 | Nicholson et al. | |
| 4,512,807 A | 4/1985 | Ogawa et al. | |
| 4,531,292 A | 7/1985 | Pasternak | |
| 4,548,825 A | 10/1985 | Voss et al. | |
| 4,576,825 A | 3/1986 | Tracy et al. | |
| 4,578,273 A | 3/1986 | Krubert | |
| 4,601,756 A | 7/1986 | Chiba et al. | |
| 4,620,876 A | 11/1986 | Fujii et al. | |
| 4,668,523 A | 5/1987 | Begleiter | |
| 4,670,271 A | 6/1987 | Pasternak | |
| 4,694,302 A | 9/1987 | Hackleman et al. | |
| 4,761,180 A | 8/1988 | Askeland et al. | |
| 4,780,326 A | 10/1988 | Stemmler et al. | |
| 4,781,758 A | 11/1988 | Gendler et al. | |
| 4,791,165 A | 12/1988 | Bearss et al. | |
| 4,810,292 A | 3/1989 | Palmer et al. | |
| 4,816,501 A | 3/1989 | Nomura et al. | |
| 4,825,227 A | 4/1989 | Fischbeck et al. | |
| 4,853,037 A | 8/1989 | Johnson et al. | |
| 4,859,242 A * | 8/1989 | Hughes .................. | C09D 5/00 524/55 |
| 4,902,568 A | 2/1990 | Morohoshi | |
| 4,937,598 A | 6/1990 | Hine et al. | |
| 4,985,260 A | 1/1991 | Niaura et al. | |
| 5,002,789 A * | 3/1991 | Graf et al. ............ | 426/540 |
| 5,006,362 A | 4/1991 | Hilborn | |
| 5,069,918 A | 12/1991 | Graf et al. | |
| 5,073,392 A | 12/1991 | Atwell et al. | |
| 5,073,399 A | 12/1991 | Vassiliou | |
| 5,091,004 A | 2/1992 | Tabayashi et al. | |
| 5,112,399 A | 5/1992 | Slevin et al. | |
| 5,125,969 A | 6/1992 | Nishiwaki et al. | |
| 5,147,673 A | 9/1992 | Schul | |
| 5,156,675 A | 10/1992 | Breton et al. | |
| 5,221,332 A | 6/1993 | Kohlmeier | |
| 5,230,913 A | 7/1993 | Klemann | |
| 5,230,918 A | 7/1993 | Anderson et al. | |
| 5,265,315 A | 11/1993 | Hoisington et al. | |
| 5,281,261 A | 1/1994 | Lin et al. | |
| 5,300,310 A | 4/1994 | Elsen | |
| 5,308,441 A | 5/1994 | Kern | |
| 5,316,575 A | 5/1994 | Lent et al. | |
| 5,362,504 A | 11/1994 | Kamper et al. | |
| 5,393,333 A | 2/1995 | Trouve | |
| 5,397,387 A | 3/1995 | Deng et al. | |
| 5,409,715 A | 4/1995 | Meyers | |
| 5,423,252 A | 6/1995 | Yamamoto et al. | |
| 5,431,720 A | 6/1995 | Nagai et al. | |
| 5,431,722 A | 6/1995 | Yamashita et al. | |
| 5,433,960 A | 7/1995 | Meyers | |
| 5,435,840 A | 7/1995 | Hilborn | |
| 5,439,514 A | 8/1995 | Kashiwazaki et al. | |
| 5,443,628 A | 8/1995 | Loria et al. | |
| 5,453,122 A | 9/1995 | Lyon | |
| 5,458,898 A | 10/1995 | Kamper et al. | |
| 5,462,590 A | 10/1995 | Yui et al. | |
| 5,466,287 A | 11/1995 | Lyon | |
| 5,505,755 A | 4/1996 | Ernst | |
| 5,522,922 A | 6/1996 | Furusawa et al. | |
| 5,531,818 A | 7/1996 | Lin et al. | |
| 5,534,281 A | 7/1996 | Pappas et al. | |
| 5,580,372 A | 12/1996 | Gino et al. | |
| 5,601,639 A | 2/1997 | Myers et al. | |
| 5,611,851 A | 3/1997 | DeLuca et al. | |
| 5,624,485 A | 4/1997 | Calhoun | |
| 5,637,139 A | 6/1997 | Morelos et al. | |
| 5,643,585 A | 7/1997 | Arad et al. | |
| 5,659,346 A | 8/1997 | Moynihan et al. | |
| 5,667,569 A | 9/1997 | Fujioka | |
| 5,681,380 A | 10/1997 | Nohr et al. | |
| 5,705,247 A | 1/1998 | Arai et al. | |
| 5,716,253 A | 2/1998 | Aoki et al. | |
| 5,757,391 A | 5/1998 | Hoisington | |
| 5,780,060 A | 7/1998 | Levy et al. | |
| 5,800,601 A | 9/1998 | Zou et al. | |
| 5,882,707 A | 3/1999 | Grillo et al. | |
| 5,935,310 A | 8/1999 | Engel et al. | |
| 5,961,703 A | 10/1999 | Fraas | |
| 5,972,085 A | 10/1999 | Simpson | |
| 5,985,424 A | 11/1999 | De Matte et al. | |
| 6,020,397 A | 2/2000 | Matzinger | |
| 6,058,843 A | 5/2000 | Young | |
| 6,067,996 A | 5/2000 | Weber et al. | |
| 6,109,722 A | 8/2000 | Underwood et al. | |
| 6,120,821 A * | 9/2000 | Goodin et al. ............. | 426/268 |
| 6,123,848 A | 9/2000 | Quepons Dominguez et al. | |
| 6,171,602 B1 | 1/2001 | Roman | |
| 6,221,407 B1 | 4/2001 | Gallart et al. | |
| 6,231,654 B1 | 5/2001 | Elwakil | |
| 6,231,896 B1 | 5/2001 | Ford et al. | |
| 6,231,901 B1 * | 5/2001 | Sharkasi et al. ............ | 426/101 |
| 6,267,997 B1 | 7/2001 | Ream et al. | |
| 6,277,498 B1 | 8/2001 | Endo et al. | |
| 6,299,374 B1 | 10/2001 | Naor et al. | |
| 6,346,237 B2 | 2/2002 | Lemann et al. | |
| 6,352,713 B1 | 3/2002 | Kirschner et al. | |
| 6,440,336 B1 | 8/2002 | Weinreich et al. | |
| 6,461,652 B1 | 10/2002 | Henry et al. | |
| 6,495,179 B1 | 12/2002 | Zietlow et al. | |
| 6,509,045 B2 | 1/2003 | Henry et al. | |
| 6,576,347 B1 | 6/2003 | Gomez Portela | |
| 6,607,744 B1 | 8/2003 | Ribi | |
| 6,616,958 B1 | 9/2003 | Stewart | |
| 6,623,553 B2 | 9/2003 | Russell et al. | |
| 6,627,212 B2 | 9/2003 | Uzunian et al. | |
| 6,648,951 B2 | 11/2003 | Chen et al. | |
| 6,652,897 B1 | 11/2003 | Stewart | |
| 6,660,318 B2 | 12/2003 | Yoon et al. | |
| 6,672,254 B1 | 1/2004 | Butts | |
| 6,706,098 B2 | 3/2004 | Leu et al. | |
| 6,747,072 B1 | 6/2004 | Siddiqui | |

(56) References Cited

U.S. PATENT DOCUMENTS

| | | |
|---|---|---|
| 6,866,863 B2 | 3/2005 | Ribi |
| 6,881,430 B2 | 4/2005 | Kohler et al. |
| 6,887,504 B2 | 5/2005 | Palmer et al. |
| 6,893,671 B2 | 5/2005 | Ben-Yoseph et al. |
| 6,902,609 B2 | 6/2005 | Steffenino et al. |
| 7,022,331 B2 | 4/2006 | Theisen |
| 7,029,112 B2 | 4/2006 | Shastry et al. |
| 7,083,805 B2 | 8/2006 | Begleiter |
| 7,115,297 B2 | 10/2006 | Stillman |
| 7,122,215 B2 | 10/2006 | Ludwig et al. |
| 7,166,153 B2 | 1/2007 | Russell et al. |
| 7,247,199 B2 | 7/2007 | Baydo et al. |
| 7,261,769 B2 | 8/2007 | Bhaskaran et al. |
| 7,279,184 B2 | 10/2007 | Gow et al. |
| 7,279,189 B2 | 10/2007 | Lauro |
| 7,314,510 B2 | 1/2008 | Ueki |
| 7,431,956 B2 | 10/2008 | Baydo et al. |
| 7,431,957 B2 | 10/2008 | Baydo et al. |
| 2001/0038871 A1 | 11/2001 | Nardi |
| 2001/0046535 A1 | 11/2001 | Bowling |
| 2002/0008751 A1 | 1/2002 | Spurgeon et al. |
| 2002/0034475 A1 | 3/2002 | Ribi |
| 2002/0078858 A1 | 6/2002 | Chen et al. |
| 2002/0114863 A1 | 8/2002 | Ream et al. |
| 2002/0114878 A1 | 8/2002 | Ben-Yoseph et al. |
| 2002/0135651 A1 | 9/2002 | Spurgeon et al. |
| 2002/0172721 A1 | 11/2002 | Boulos et al. |
| 2002/0192352 A1 | 12/2002 | Dar |
| 2003/0031768 A1 | 2/2003 | Dalziel et al. |
| 2003/0037700 A1 | 2/2003 | Leu et al. |
| 2003/0091700 A1 | 5/2003 | Zietlow et al. |
| 2003/0097949 A1 | 5/2003 | Candler et al. |
| 2003/0101902 A1 | 6/2003 | Reitnauer et al. |
| 2003/0103905 A1* | 6/2003 | Ribi ............... C07C 233/20 424/10.3 |
| 2003/0157326 A1* | 8/2003 | Vaghefi ............ A61K 9/1617 428/402.2 |
| 2003/0161913 A1 | 8/2003 | Stewart |
| 2003/0198720 A1 | 10/2003 | Stewart |
| 2003/0211293 A1 | 11/2003 | Nemoto et al. |
| 2004/0004649 A1 | 1/2004 | Bibl et al. |
| 2004/0013778 A1 | 1/2004 | Ackley, Jr. et al. |
| 2004/0021757 A1 | 2/2004 | Shastry et al. |
| 2004/0043134 A1 | 3/2004 | Corriveau et al. |
| 2004/0050289 A1 | 3/2004 | Russell et al. |
| 2004/0086603 A1 | 5/2004 | Shastry et al. |
| 2004/0086605 A1 | 5/2004 | Sox |
| 2004/0087669 A1 | 5/2004 | Hausmanns et al. |
| 2004/0096569 A1 | 5/2004 | Barkalow et al. |
| 2004/0101615 A1 | 5/2004 | Barker et al. |
| 2004/0120991 A1 | 6/2004 | Gardner et al. |
| 2004/0131730 A1 | 7/2004 | Dalziel et al. |
| 2004/0170725 A1 | 9/2004 | Begleiter |
| 2004/0175463 A1 | 9/2004 | Shastry et al. |
| 2004/0213875 A1 | 10/2004 | Stewart |
| 2005/0003056 A1 | 1/2005 | Romanach et al. |
| 2005/0008735 A1 | 1/2005 | Pearce |
| 2005/0058749 A1 | 3/2005 | Romanach et al. |
| 2005/0058753 A1 | 3/2005 | Romanach |
| 2005/0061184 A1 | 3/2005 | Russell et al. |
| 2005/0069612 A1 | 3/2005 | Wen et al. |
| 2005/0118306 A1* | 6/2005 | Ludwig ............... A23L 2/395 426/96 |
| 2005/0147724 A1 | 7/2005 | Schweinfurth |
| 2005/0157148 A1 | 7/2005 | Baker et al. |
| 2005/0163898 A1 | 7/2005 | Romanach et al. |
| 2005/0230420 A1 | 10/2005 | Smith et al. |
| 2005/0255202 A1 | 11/2005 | Dalziel et al. |
| 2005/0257716 A1 | 11/2005 | Mazzella et al. |
| 2006/0019006 A1 | 1/2006 | Bates |
| 2006/0038866 A1 | 2/2006 | Wen et al. |
| 2006/0051425 A1 | 3/2006 | Kvitnitsky et al. |
| 2006/0051458 A1 | 3/2006 | Fornaguera |
| 2006/0068019 A1 | 3/2006 | Dalziel et al. |
| 2006/0110551 A1 | 5/2006 | Shastry et al. |
| 2006/0151533 A1 | 7/2006 | Simunovic et al. |
| 2006/0182691 A1 | 8/2006 | Besse et al. |
| 2006/0182856 A1 | 8/2006 | Ornelaz |
| 2006/0228451 A1 | 10/2006 | Martin |
| 2006/0251687 A1 | 11/2006 | Lapidot et al. |
| 2006/0275528 A1 | 12/2006 | Collins et al. |
| 2006/0275529 A1 | 12/2006 | Woodhouse et al. |
| 2007/0048407 A1 | 3/2007 | Collins et al. |
| 2007/0071680 A1 | 3/2007 | Ribi |
| 2007/0098859 A1 | 5/2007 | Shastry et al. |
| 2008/0014321 A1 | 1/2008 | Schweinfurth et al. |
| 2008/0032011 A1 | 2/2008 | Liniger |
| 2008/0075830 A1 | 3/2008 | Wen et al. |
| 2008/0317914 A1 | 12/2008 | Baydo |
| 2009/0004345 A1 | 1/2009 | Baydo |
| 2009/0186121 A1 | 7/2009 | Hutchison et al. |
| 2009/0298952 A1 | 12/2009 | Brimmer |
| 2010/0047415 A1 | 2/2010 | Baydo et al. |
| 2010/0055264 A1 | 3/2010 | Liniger et al. |

FOREIGN PATENT DOCUMENTS

| | | |
|---|---|---|
| CN | 1158346 | 9/1997 |
| EP | 0340776 | 11/1989 |
| EP | 0475075 | 3/1992 |
| EP | 0705890 | 4/1996 |
| EP | 1611798 | 1/2006 |
| GB | 2277094 | 10/1994 |
| JP | 58052375 | 3/1983 |
| JP | 59042864 | 3/1984 |
| JP | 61036364 | 2/1986 |
| JP | 62239955 | 10/1987 |
| JP | 63063363 | 3/1988 |
| JP | 1034263 | 2/1989 |
| JP | 1035232 | 2/1989 |
| JP | 3195462 | 8/1991 |
| JP | 7008211 | 1/1995 |
| JP | 8308532 | 11/1996 |
| JP | 9084566 | 3/1997 |
| JP | 2000041621 | 2/2000 |
| JP | 2000302987 | 10/2000 |
| JP | 2003535923 | 12/2003 |
| JP | 2004073609 | 3/2004 |
| JP | 2004246255 | 9/2004 |
| JP | 2004246256 | 9/2004 |
| JP | 2005253393 | 9/2005 |
| JP | 2006311850 | 11/2006 |
| KR | 20020000069 | 1/2002 |
| WO | WO 90/12513 | 11/1990 |
| WO | WO 92/14795 | 9/1992 |
| WO | 95/01735 | 1/1995 |
| WO | WO 95/27758 A | 10/1995 |
| WO | WO 97/17409 | 5/1997 |
| WO | WO 97/35933 | 10/1997 |
| WO | WO 00/03609 | 1/2000 |
| WO | WO 00/25603 | 5/2000 |
| WO | WO 01/94116 | 12/2001 |
| WO | WO 02/085995 | 10/2002 |
| WO | WO 2004/003089 | 1/2004 |
| WO | WO 2004/012518 | 2/2004 |
| WO | WO 2004/080191 | 9/2004 |
| WO | WO 2005/002360 | 1/2005 |
| WO | WO 2005/006884 | 1/2005 |
| WO | WO 2005/027655 | 3/2005 |
| WO | WO 2005/079223 | 9/2005 |
| WO | WO 2005/086655 | 9/2005 |
| WO | WO 2005/113693 | 12/2005 |
| WO | WO 2005/122784 | 12/2005 |
| WO | WO 2006/023615 | 3/2006 |
| WO | WO 2006/086780 | 8/2006 |
| WO | WO 2006/086781 | 8/2006 |
| WO | WO 2006/121936 | 11/2006 |
| WO | WO 2007/005063 | 1/2007 |
| WO | WO 2007/109754 | 9/2007 |

(56) References Cited

FOREIGN PATENT DOCUMENTS

| WO | WO 2007/115050 | 10/2007 |
|---|---|---|
| WO | WO 2007/130983 | 11/2007 |

OTHER PUBLICATIONS

Zuidam et al., Overview of Microencapsulates for Use in Food Products or Processes and Methods to Make Them, Chapter 2, Encapsulation Technologies for Active Food Ingredients and Food Processing, Springer, Hardcover, 2010.*
Agargel, Carrageen, accessed at http://www.agargel.com.br/carrageenantec.html (Year: 2003).*
Chocolate Truffle Croquembouche, Bon Appetit, accessed at https://www.epicurious.conn/recipes/food/views/chocolate-truffle-croquembouche-2831 (ANON) (Year: 1991).*
Edible Glitter, Edible Glitter™—Watson Inc., 2006, accessed at https://www.watson-inc.com/our-capabilities/film-technology/edible-glitter/.*
Aldrich Chemical, "Silsesquioxanes, Bridging the Gap Between Polymers and Ceramics," Chemfiles (2001) 1(6):1-14.
Database WPI Week 2001, Derwent Publications Ltd., London, GB; AN 2001-409143 (XP002348407), Li, Y: "High grade edible paint mimeograph," & CN 1 158 346 A (Li Y) (Sep. 3, 1997) abstract.
Ingredient Statement: 6# Refined Glaze in Butylac; Origination Date: Jan. 9, 2004.
Ingredient Statement: 8# Esterified Shellac M-4; Origination Date Jan. 9, 2004.
Ingredient Statement: Certified R-100 Refined Grade Shellac; Origination Date Jun. 25, 2001.
Ingredient Statement: Mantrolac R-100 in Propylene Glycol FG; Origination Date: Jan. 12, 2004.
Material Safety Data Sheet, Certified R-100 Refined Bleached Shellac, Mantrose-Haeuser Company; Origination Date: May 1, 2001.
Stepan Company, "Stepan® EDS" Product Bulletin (2006) 2 pages.
Technical Information: 8# White French Varnish M-4. Mantrose-Bradshaw-Zinsser Group, Origination date Jan. 9, 2004.
Technical Information: Certified R-100 Refined Bleached Shellac. Mantrose-Bradshaw-Zinsser Group, Origination date Jan. 9, 2004.
Tolliver-Nigro, "Taking the Sting Out of No-Tox," Ink Maker (2003).
Univar Food Ingredients, "Hydrocolloids," (2005) 2 pages.
Universal Stenciling and Marking Systems, Inc., "USMR Micro-Spray Markers All Models Owner's Manual," St. Petersburg, FL (Sep. 2, 2004) 1-29.
Universal Stenciling and Marking Systems, Inc., "USMR-20 AF Micro-Spray Marker" Technical Bulletin, 1 page.
Universal Stenciling and Marking Systems, Inc., "Gravity feed ink reservoirs," Technical Bulletin, 1 page.
Van Nieuwenhuyzen, W., "Lecithin Production and Properties," J. Am. Oil Chem. Soc. (1976) 53:425-427.
Yinghua, S., "Synthesis of propylene glycol," Shenyang Chemical Technology (1996) 3:35.
United States Office Action for U.S. Appl. No. 10/601,064 dated Mar. 27, 2006 (15 pages).
United States Office Action for U.S. Appl. No. 10/601,064 dated Jul. 24, 2007 (13 pages).
Chinese Patent Office Action for Application No. 200580026607.6 dated Apr. 16, 2009 (12 pages).
European Patent Office Action for Application No. 05760453 dated Jul. 7, 2008 (3 pages).
Japanese Patent Office Action for Application No. 2007-527783 dated Jun. 10, 2009 (3 pages) translation only.
United States Office Action for U.S. Appl. No. 11/149,660 dated Jul. 16, 2007 (13 pages).
International Search Report and Written Opinion for Application No. PCT/US2005/020598 dated Oct. 20, 2005 (8 pages).
European Patent Office Action for Application No. 06735439.9 dated Apr. 1, 2008 (4 pages).
European Patent Office Action for Application No. 06735439.9 dated Dec. 1, 2008 (2 pages).
International Search Report and Written Opinion for Application No. PCT/US2006/05777 dated Sep. 29, 2006 (6 pages).
International Search Report and Written Opinion for Application No. PCT/US2007/067940 dated Jun. 23, 2008 (8 pages).
United States Office Action for U.S. Appl. No. 11/770,678 dated May 29, 2009 (34 pages).
International Search Report and Written Opinion for Application No. PCT/US2007/072416 dated Jun. 28, 2007 (14 pages).
Chigurupati, N. et al., "Evaluation of red cabbage dye as a potent natural color for pharmaceutical use," Int. J. Pharm. (2002) 241:293-299.
Merriam-Webster's Collegiate Dictionary, Entries for "Dye, natural, nutraceutical, plate and salt," (2004) pp. 389, 826, 853, 949 and 1098, respectively (pp. 1-24 as supplied).
Rogers, M.A. et al., "A preliminary study of dietary aluminum intake and risk of Alzheimer's disease," British Geriatrics Society, Age and Ageing (1999) 28:205-209.
Wrolstad, R.E., "Anthocyanin pigments—bioactivity and coloring properties," Institute of Food Technologists, J. Food Sci.: Food Chem. Toxicol. (2004) 69(5):C419-421.
United States Patent Office Action for U.S. Appl. No. 12/299,146 dated Dec. 27, 2011 (8 pages).
United States Patent Office Action for U.S. Appl. No. 12/437,219 dated Oct. 12, 2011 (16 pages).
United States Patent Office Action for U.S. Appl. No. 12/550,146 dated Nov. 1, 2011 (9 pages).
Chowhound, "Red velvet cake—without dairy?" dated 2005, retrieved from <chowhound.chow.com> on Feb. 16, 2012, pp. 1-4.
Emeril's Butter Cookies, Emeril Lagasse, 1999, retrieved from www.foodnetwork.com on Feb. 16, 2012, pp. 1-2.
"Taking Aluminum out of the Diet" website <www.home.earthlink.net/~joannefstruve/wsn/page2.html> dated 2004, retrieved from <internetarchive.org> on Feb. 16, 2012, pp. 1-9.
Vatai, T. et al., "Extraction and formulation of anthocyanin-concentrates from grape residues," 2008, The Journal of Supercritical Fluids 45(1):32-36.
United States Patent Office Action for U.S. Appl. No. 12/437,219 dated Feb. 24, 2012 (24 pages).
United States Patent Office Action for U.S. Appl. No. 12/550,146 dated Aug. 17, 2012 (9 pages).
Brazilian Patent Office Action for Application No. PI0511926-0 dated Nov. 10, 2013 (5 pages).
Canadian Patent Office Action for Application No. 2438636 dated Dec. 21, 2010 (2 pages).
United States Patent Office Action for U.S. Appl. No. 11/994,164 dated Dec. 8, 2010 (12 pages).
European Patent Office Action for Application No. 10011401.6 dated Dec. 27, 2010 (5 pages).
European Patent Office Action for Application No. 10011405.7 dated Dec. 27, 2010 (6 pages).
United States Patent Office Final Rejection for U.S. Appl. No. 12/550,146 dated Jan. 28, 2013 (9 pages).
United States Patent Office Action for U.S. Appl. No. 12/437,219 dated Feb. 6, 2013 (22 pages).
Reade Advanced Materials information for "Silica Power, Food Grade (FCC)" including synonyms; retrieved from <www.reade.com> on Jan. 28, 2013, pp. 1-3.
Straight Dope "Sand in my chili powder?", dated Jul. 25, 2002; retrieved from <boards.straightdope.com> on Jan. 28, 2013, p. 1.
EVONIK Industries product information for "SIPERNAT® and AEROSIL® in the Food Industry"; retrieved from <www.sipernat.com> on Jan. 28, 2013, pp. 1-8.
PPG Silica Products information for "Fio-Gard™ SP Flow Conditioning Silica", dated 2011, pp. 1-2.
Huber Materials "Anti-Caking and Free-Flow Agents For the Food Industry", retrieved from <www.hubermaterials.com> on Jan. 28, 2013, pp. 1-2.
Wu, Xianli et al.; "Concentrations of Anthocyanins in Common Foods in the United States and Estimation of Normal Consumption", 2006, American Chemical Society; Journal of Agricultural and Food Chemistry, vol. 54, No. 11, pp. 4069-4075.

(56) References Cited

OTHER PUBLICATIONS

Carr et al., Textile Ink Jet Performance and Print Quality Fundamentals, National Textile Center Annual Report p. 1-10 (Nov. 2001).
Londo, Pulp & Paper Magazine: On-Machine Coating of Inkjet Paper Possible with Modified Kaolin og, 1-13 (May 2000).
Derksen et al., Spray Delivery to Nursery Trees by Air Curtain and Axial Fan Orchard Sprayers, vol. 22(1) Environ. Hort. p. 17-22. (Mar. 004).
Salyani et al., Deposition Efficiency of Different Droplet Sizes for Citrus Spraying, vol. 30(6):, p. 1595-1599 (Nov.-Dec. 1987).
Stahl, Preparation of Granules by Spray Drying, European Pharmaceutical Review, p. 1-6 (Jan. 2000).
United States Patent Office Final Rejection for U.S. Appl. No. 12/299,146 dated Mar. 27, 2013 (35 pages).
United States Patent Office Action for U.S. Appl. No. 12/550,146 dated Jun. 25, 2013 (12 pages).
Customizing flavor profiles by Ronald Deis, Nov. 7, 2006, 5 pages. <http://www.foodproductdesign.com/articles/2006/11 /customizing-sweetness-profiles.aspx>.
Glycerine profile, Feb. 10, 2004 obtained with verified date from <http://web.archive.org/web/20040201000000*/http://www.mountain roseherbs.com/learn/vegetable-glycerine.php>, 2 pages.
United States Patent Office Final Rejection for U.S. Appl. No. 12/550,146 dated Apr. 10, 2014 (13 pages).
United States Patent Office Action for U.S. Appl. No. 12/299,146 dated Jan. 14, 2015 (15 pages).
United States Patent Office Notice of Allowance for U.S. Appl. No. 12/550,146 dated Apr. 15, 2015 (7 pages).
United States Patent Office Action for U.S. Appl. No. 12/299,146 dated Apr. 16, 2015 (20 pages).
United States Patent Office Action for U.S. Appl. No. 12/299,146 dated Nov. 12, 2015.
Chemistry Learning: Colloidal Solution, True Solution and Suspension, 2010, retrieved from www.chemistrylearning.com/colloidal-solution-true-solution-and-suspension/ on Sep. 11, 2015.
United States Patent Office Action for U.S. Appl. No. 12/202,521 dated Apr. 1, 2010 (5 pages).
United States Patent Office Action for U.S. Appl. No. 12/201,569 dated Apr. 6, 2010 (6 pages).
United States Patent Office Action for U.S. Appl. No. 11/770,678 dated Apr. 29, 2010 (18 pages).

* cited by examiner

HEAT-TRIGGERED COLORANTS AND METHODS OF MAKING AND USING THE SAME

CROSS-REFERENCE TO RELATED CASES

This application claims priority to U.S. Provisional Patent Application No. 61/048,074 filed Apr. 25, 2008 and U.S. Provisional Patent Application No. 61/082,440 filed Jul. 21, 2008, both of which are incorporated by reference in their entirety.

BACKGROUND

Food colorants are well-known and regulated by government agencies. In the United States, food colorants are tested by the Food and Drug Administration and synthetic food colorants are typically marked as "FD&C Color No. X" or "D&C Color No. X" to indicate that the colorant is approved for use in foods, drugs, and cosmetics.

Recently manufacturers have begun to market novelty food products that contain unusual or unnatural color combinations. For example, H.J. Heinz Company launched green ketchup in 2000, resulting in a measurable increase in U.S. ketchup sales. Additionally, snack makers now use special formulations of food colorants to mark the tongue or teeth, marketing the products to child consumers for the "gross-out" factor. See, e.g., General Mills Corp.'s "Fruit Roll-Up Tongue Trackers."

SUMMARY

In one aspect, the invention may provide, among other things, a heat-triggered colorant for foods, the heat-triggered colorant comprising a mixture comprising a carrier having a melting point and a GRAS (Generally Recognized as Safe) first food colorant having a color, and a coating encapsulating the mixture and masking the color of the first food colorant. When the heat-triggered colorant is exposed to a temperature greater than the melting point of the carrier, the carrier melts and releases the first food colorant, thereby unmasking the color of the first food colorant. The heat triggered colorant may further comprise a second food colorant. The heat-triggered colorants are edible and suitable for inclusion into foods (including, e.g., macaroni & cheese and toaster pastries). In one embodiment, the heat-triggered colorants may be about 100 to about 500 microns in diameter. In one embodiment, the melting point of the heat-triggered colorants may be at least about 80° C. The heat-triggered colorants may comprise flavorings or fragrances.

In another aspect, the invention may provide, among other things, a heat-triggered colorant for foods, the heat-triggered colorant comprising a mixture comprising a carrier and a GRAS (Generally Recognized as Safe) first food colorant having a first color, and a coating having a melting point, encapsulating the mixture, and masking the color of the first food colorant. When the heat-triggered colorant is exposed to a temperature greater than the melting point of the coating, the coating melts and unmasks the color of the first food colorant. The heat-triggered colorants are edible, and suitable for inclusion into foods (including, e.g., macaroni & cheese and toaster pastries). In one embodiment, the heat-triggered colorants may be about 100 to about 500 microns in diameter. In one embodiment, the melting point of the heat-triggered colorants may be at least about 80° C. The heat-triggered colorants may comprise flavorings or fragrances.

In another aspect, the invention may also provide, among other things, methods for changing the color of a food. The method comprises incorporating a heat-triggered colorant into a food, the heat-triggered colorant including a mixture comprising a carrier having a melting point and a GRAS (Generally Recognized as Safe) first food colorant having a color, and a coating encapsulating the mixture, such that when the heat-triggered color changer is exposed to a temperature greater than the melting point of the carrier, the carrier melts and the coating collapses, releasing the first food colorant and changing the color of the food. The coating may optionally comprise a second food colorant.

In another aspect, the invention may also provide, among other things, methods for changing the color of a food. The method comprises incorporating a heat-triggered colorant into a food, the heat-triggered colorant including a mixture comprising a carrier and a GRAS (Generally Recognized as Safe) first food colorant having a first color, and a coating, having a melting point, encapsulating the mixture, such that when the heat-triggered color changer is exposed to a temperature greater than the melting point of the coating, the coating melts, releasing the first food colorant and changing the color of the food. The coating may optionally comprise a second food colorant.

In another aspect, the invention may also provide, among other things, methods for making heat-triggered colorants. The method comprises mixing a first food colorant and a carrier having a melting point to create a mixture, prilling the mixture to form a particle smaller than 500 microns in diameter; and coating the particle with a coating having a melting point. Coating may include, but need not be limited to, Wurzter coating, spray coating, and dip coating.

BRIEF DESCRIPTION OF THE DRAWINGS

As shown in FIG. 2, a first food colorant and a carrier may be mixed to form a mixture. The mixture is then processed to make particles of the colorant and carrier. Subsequently, the particles may be encapsulated or covered with a coating. Optionally, a second colorant may be added to the coating.

DETAILED DESCRIPTION

Figure 1:
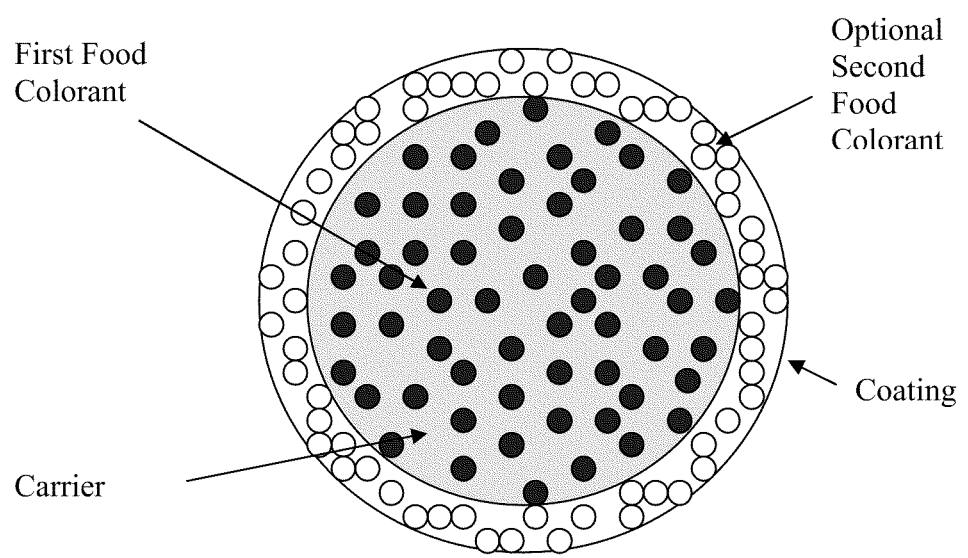
FIG. 1 illustrates one embodiment of a heat-triggered colorant of the invention. The heat-triggered colorant comprises a first food colorant, a carrier, and a coating. The coating contains, covers, or encapsulates the first food colorant and the carrier. The coating may also mask the appearance of the first food colorant. The coating may comprise an optional second food colorant.
Figure 2:
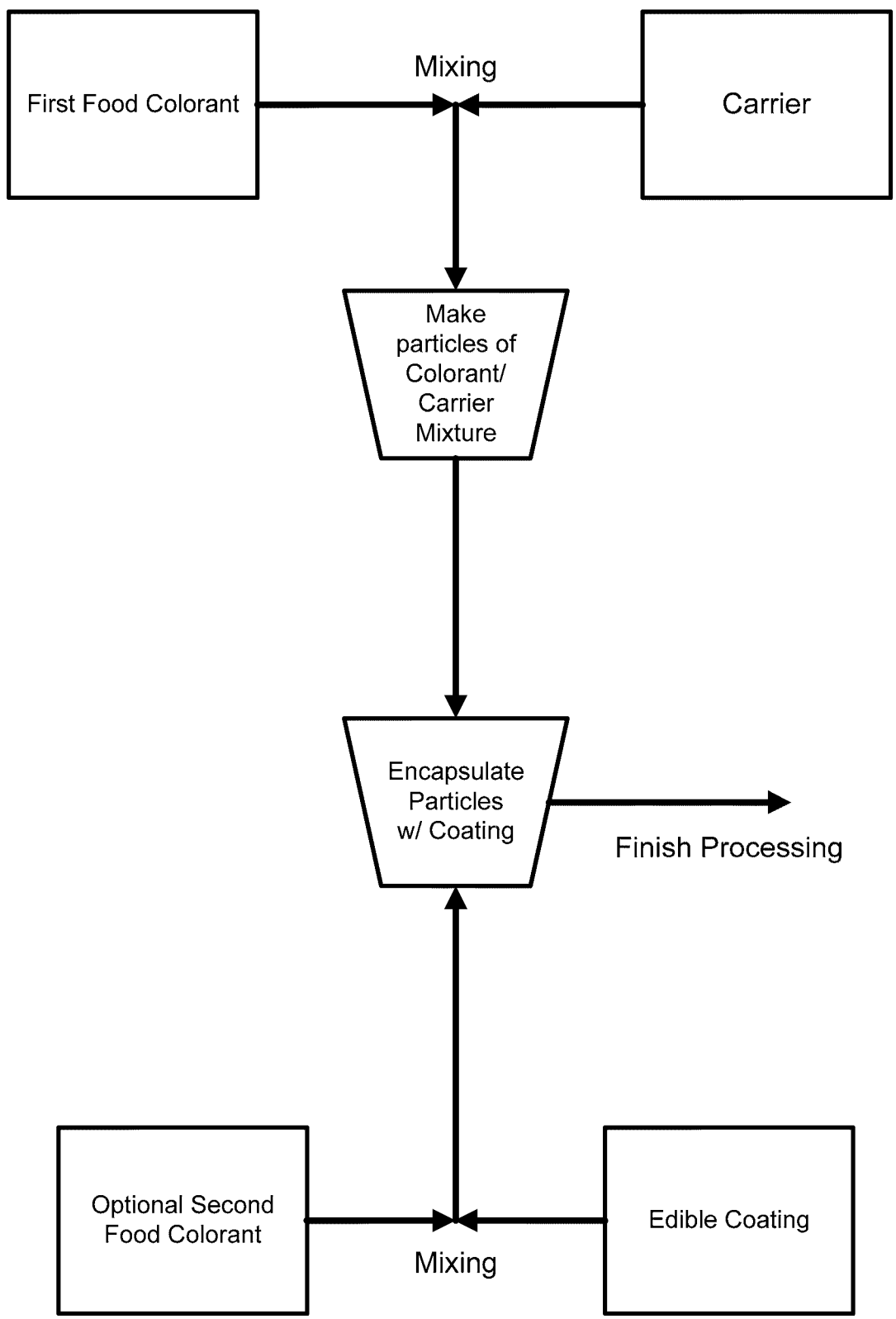
FIG. 2 illustrates a process for forming the heat-triggered colorants of the invention.

Before any embodiments of the invention are described in detail, it is to be understood that the invention is not limited in its application to the details of construction and the arrangement of components set forth in the following description. The invention is capable of other embodiments and of being practiced or of being carried out in various ways. Also it is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Further, no admission is made that any reference, including any patent or patent document, cited in this specification constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

Generally speaking, the invention provides heat-triggered colorants that are safe for incorporation into many foodstuffs and methods for making the same. Upon application of heat, the heat-triggered carrier melts, revealing the first food colorant. The invention thereby allows a food manufacturer to disguise the first food colorant in a food.

In one embodiment, a first food colorant is mixed with an edible carrier material that is normally a solid at room temperature, but melts at elevated temperatures. The mixture of the first food colorant and the carrier material is formed into small particles by a process such as prilling. The particles are next coated with an edible coating such as shellac. The coating may contain a second food colorant such that the resulting coated particles have a different outer color than the first food colorant. That is, the first food colorant may have a first color, and the second food colorant has a second color. The first and second colors may be different, or they may be the same. Either the carrier material, or the coating, or both may suitably contain colorants, flavorings, fragrance, texturants, binders, or surfactants as necessary to achieve a desired color, fragrance, flavor, or texture in the heat-triggered colorants.

The coating for the heat triggered colorant may suitably contain dyes or lakes to mask the appearance of the first food colorant. For example, the coating may contain $TiO_2$, resulting in a seemingly white powder which changes to blue, red, etc., upon heating the heat-triggered colorants. The colorants in the coating may also be coordinated with the first food colorant to obtain a desirable color effect. In some embodiments, contact between the first and second colorants will result in the creation of a third color. For example, a yellow colorant may be added to the coating while a blue colorant is used as the first food colorant. The resulting product may change from yellow to green to blue as it is heated.

The performance of the heat-triggered colorants may be influenced by the melting point of the carrier. In these embodiments, once the carrier melts the first food colorant will be exposed, changing the color of the food. Heat-triggered colorants of the invention will be most useful when the melting point of the carrier is less than about 300° C., less than about 200° C., less than about 100° C., or less than about 70° C. Often, the carrier will have a melting point greater than about 40° C., suitably greater than about 60° C., more suitably greater than about 80° C.

The performance of the heat-triggered colorants may be influenced by the melting point of the coating. In these embodiments, once the coating melts the first food colorant will be exposed, changing the color of the food. Heat-triggered colorants of the invention will be most useful when the melting point of the coating is less than about 300° C., less than about 200° C., less than about 100° C., or less than about 70° C. Often, the coating will have a melting point greater than about 40° C., suitably greater than about 60° C., more suitably greater than about 80° C.

In some embodiments having a meltable coating, the carrier may have a similar or much higher melting point than the coating. In embodiments wherein the carrier has a similar melting point to the coating, the carrier will melt shortly after the coating, thereby dispersing the colorant into the food. In embodiments wherein the carrier has a melting point much higher than the melting point of the coating, the carrier will remain intact after the coating has melted.

Heat-triggered colorants of the present invention will be most useful when used at temperatures greater than about 0° C., greater than about 20° C., or greater than about 40° C. However, the heat-triggered colorants of the present invention will be most useful when used at temperatures less than about 300° C., less than about 200° C., less than about 100° C., or less than about 70° C. Often, the heat-triggered colorants of the present invention will be activated by temperatures greater than about 40° C., suitably greater than about 60° C., more suitably greater than about 80° C.

A wide variety of food grade materials may be incorporated into the heat-triggered colorants of the present invention. Generally, up to a specified amount of a food grade compound can be ingested by a human without causing deleterious health effects. Examples of food grade compounds include those compounds "generally recognized as safe" ("GRAS") by the United States Food and Drug Administration ("FDA") and colorants approved by the FDA for use in foods for human consumption. In particular, food safe compounds include those compounds listed as approved under 21 C.F.R. §§ 73, 74, 172, 182 and 184.

Approved food grade colorants include natural colorants and synthetic dyes and lakes approved for human consumption. Dyes are typically water-soluble colorants, while lakes typically are prepared as a dye absorbed on to a water-insoluble substrate to create a non-migrating pigment for applications where water may be present and no migration of the color is desired. The lake can also be easily incorporated into water-insoluble foodstuffs such as systems containing oils and fats. In some embodiments, a water soluble dye may be emulsified with an oil (e.g., coconut oil) to allow the dye to be incorporated into water-insoluble foodstuffs. Natural food dyes may include caramel coloring (brown), annatto (orange), copper chlorophyllin (green), carmine/cochineal extract (red), beet juice (red), paprika oleoresin (red-orange), saffron (yellow), turmeric (yellow-orange), beta carotene (yellow-orange), black carrot and many other fruit and vegetable sources of anthocyanins (pink-red-purple), and other colorants derived from fruit or vegetable juices or extracts. FD&C approved synthetic food dyes may include FD&C Blue No. 1, FD&C Blue No. 2, FD&C Green No. 3, FD&C Red No. 40, FD&C Red No. 3, FD&C Yellow No. 5, and FD&C Yellow No. 6. To achieve a desired color tint or shade, a colorant may include mixtures of more than one food grade synthetic dye or lake and/or natural colorant or pigment.

Carrier materials appropriate for the present invention might be any of a wide variety of edible materials that might be used as a carrier for a food colorant. Carrier materials may be water soluble, partially water soluble, or water insoluble, depending upon the intended use of the resultant heat-triggered colorant. Water soluble carrier materials may include, but are not limited to, carbohydrates, such as sugars and starches. Water soluble carriers may also include inorganic materials such as salts, oxides, and hydrates. Partially water soluble carrier materials might include, but are not limited to, peptides, such as gelatins. Water insoluble carrier materials include, but are not limited to, lipids, including oils, waxes, fats, stearates, and glycerides. The carrier materials typically have their origin in plant or animal matter. The carrier material is chosen so that the carrier material will melt at the desired temperature, thus releasing the first food colorant. A suitable carrier may comprise, but need not be limited to, erythritol distearate (Stepan Co., Northfield, Ill.) and hydrogenated cottonseed wax (Dritex C, AC Humko, Memphis, Tenn.).

Often the carrier material and the first food colorant will be mixed prior to being formed into small particles. Such a mixture may be made by, but need not be limited to, stirring, mixing, blending, sonicating, shaking, or agitating. For example, the mixture may be mixed in a Silverson Rotor Stator mixer (Silverson Machines, Inc. East Longmeadow, Mass.). The mixture of carrier material and first food colorant generally comprises, by weight, at least about 0.1% first food colorant, at least about 0.5% first food colorant, at least about 1% first food colorant, at least about 5% first food colorant, or at least about 10% first food colorant. The mixture of carrier material and first food colorant generally comprises, by weight, less than about 50% first food colorant, less than about 25% first food colorant, or less than about 15% first food colorant. Suitably, the amount of first food colorant in the mixture of carrier material and first food colorant will be about 0.5% to about 20% by weight, and more suitably about 1% to about 5% by weight.

A wide variety of coatings, including coatings with heat-triggered properties, suitable for forming an edible exterior coating over small particles of carriers and first food colorants, may be used for the present invention. Such coatings may be made from available food and/or pharmaceutical shellacs such as those offered by Mantrose-Haeuser (Attleboro, Mass.). Such coatings may suitably comprise a film coating, a seal coating, or a granular coating. Specifically coatings may comprise, but need not be limited to, shellac R-49 NF, ethyl cellulose, zein, and starches. (All available from Mantrose-Haeuser, Attleboro, Mass.)

In some embodiments the coatings are not heat-sensitive. These coatings merely collapse as the interior carrier melts at high temperature. Because the coatings are edible, they are metabolized by or removed from the body in an acceptable manner.

In other embodiments, the coatings are heat-sensitive and melt at elevated temperatures. Such temperatures may be greater than about 35° C., suitably greater than about 60° C., or more suitably greater than about 80° C. As desired, the coatings may also include additives to modify the color, texture, sheen, taste, or fragrance of the coating. A mixture of coatings and additives generally comprises, by weight, less than about 50% of additive, less than about 25% of additive, or less than about 15% of additive. Suitably, the amount of additive in the mixture of coating and additive will be about 0.5% to about 20% by weight, and more suitably about 1% to about 5% by weight. These additives may be dispersed throughout the coatings by using, for example a homogenizer, such as the L2R available from Silverson Machines, Inc. (East Longmeadow, Mass.).

The mixture of carrier material and first food colorant are formed into small particles prior to being coated with the coating. It is generally possible to make the small particles of a mixture of carrier material and first food colorant with a spray prilling process, however other processes such as hot melt extrusion, or hot melt granulation, may also be used. Hot melt granulation may be performed with machines such as the Sandvik Rotoform steel belt pastilles processor, available from Sandvik Materials Technology Group (Sandviken, Sweden). Other methods (and manufacturers) are known, and may also be used to achieve suitable particles. For example, the mixture of carrier material and first food colorant may be heated and then extruded through a food press, such as those offered by Extrufood, USA (Burr Oak, Ill.). The extruded mixture of carrier material and first food colorant may be suitably cut, agitated, pulverized, spheronized, etc. to produce a desired size and shape.

Prilling is a method of creating spherical particles of a desired range by releasing droplets of a molten material into a stream of cold air. Typically, a material to be prilled is a solid at room temperature. The material to be prilled is first heated to form a liquid. Next, the molten material to be prilled is either distributed across a screen, or sprayed with an injector or atomizing nozzle, or forced through a spinning bucket or bowl where the bucket or bowl has holes or vanes. Upon leaving the screen, nozzle, bowl, etc. droplets of the molten material cool in the air, and are collected at the bottom of the prilling chamber, or alternatively, carried out of the prilling chamber with the cool air stream to another product collection device. The process typically produces small spheres; however process conditions may produce non-spherical particles that are still suitable for further processing as described in the present invention. Spray heads suitable for prilling material in accordance with the invention are sold by Spraying Systems Co. (Wheaton, Ill.), for example. Prilling machines, also suitable for the invention, are sold by Niro, Inc., (Columbia, Md.).

Prior to coating, particles of the mixture of carrier material and first food colorant are typically spheres; however, the particles need not be spheres and may be, for example, footballs, cylinders, obloid spheroids, or some other irregular shape, e.g., popcorn. The particles of the mixture of carrier material and first food colorant are typically formed to be smaller than about 5 cm, smaller than about 1 cm, smaller than about 2 mm, or smaller than about 500 μm. The particles of the mixture of carrier material and first food colorant are typically formed to be larger than about 200 nm, larger than about 1 μm, larger than about 10 μm, or larger than about 100 μm. In many embodiments, the heat-triggered colorants will be about 100 microns to about 500 microns in diameter. The range of sizes of the particles of the mixture of carrier material and first food colorant is typically assessed by averaging several weight-volume measurements of the particles.

After the mixture of carrier material and first food colorant has been formed into small particles, the small particles are then encapsulated or coated with a coating. The coating process typically involves suspending or agitating the small particles of carrier material and first food colorant in a stream of air, and moving the particles through a stream of liquefied coating. Depending upon the materials used and the desired thickness, a particle may make one pass through the stream of liquefied coating or it may make several passes, achieving a progressively thicker coating with each pass. Many methods are known by those of ordinary skill in the art for coating particles. For example, the particles may be suspended via a fluidized bed and the coating sprayed from a nozzle, jet, or atomizer (Wurster coating). Machines for Wurster coating are sold by Vector Corporation (Marion, Iowa), Fluid Air (Chicago, Ill.), or Glatt Air Techniques (Ramsey, N.J.). Alternatively, the small particles may be coated as the small particles are dropped into, or moved through, liquefied coating. Alternatively, the small particles may be coated via pan coating or dip coating.

The heat-triggered colorants may generally comprise, by weight, at least about 0.1% first food colorant, in some cases at least about 1% first food colorant, and in other cases, at least about 10% first food colorant. The heat-triggered colorants may generally comprise, by weight, less than about 80% first food colorant, in some cases less than about 50% first food colorant, and in other cases, less than about 20% first food colorant. Suitably, the heat triggered colorants may comprise, by weight, about 0.5% to about 50% first food colorant, and more suitably, about 5% to about 10% first food colorant.

The heat-triggered colorants may generally comprise, by weight, at least about 1% carrier material, in some cases at least about 5% carrier material, and in other cases, at least about 20% carrier material. The heat-triggered colorants may generally comprise, by weight, less than about 98% carrier material, in some cases less than about 90% carrier material, and in other cases, less than about 70% carrier material. Suitably, the heat triggered colorants may comprise, by weight, about 40 to about 80% carrier material, and more suitably, about 50 to about 70% carrier material.

The heat-triggered colorants may generally comprise, by weight, at least about 0.1% coating, in some cases at least about 1% coating, and in other cases, at least about 10% coating. The heat-triggered colorants may generally comprise, by weight, less than about 60% coating, in some cases less than about 40% coating, and in other cases, less than about 20% coating. Suitably, the heat triggered colorants may comprise, by weight, about 10% to about 40% of coating, and more suitably, about 15% to about 25% of coating.

After the heat-triggered colorants are formed, they may be suitably incorporated into any number of foods. It is contemplated that these foods may include, but should not be limited to, products such as meats, dairy products, toaster pastries, frozen baked goods (waffles, pancakes, crusts, biscuits, etc.), refrigerated baked goods (dough, breads, crusts, rolls, cookies, biscuits, etc.), candy, processed fruit products, dry baking mixes (cake, cookie, brownie, pancake, waffle, bread, cupcake, muffin, crusts, etc.), dry dessert mixes (mousse, jello, pudding, etc.), baking chips (chocolate, peanut butter, butterscotch, etc.), dry beverage mixes (hot chocolate/cocoa, etc.), pasta products (noodles, packaged macaroni & cheese, etc.), hot breakfast grains (oatmeal, grits, cream of wheat, etc.), mashed potatoes (ready to eat and instant), dry mix meals (soup, pasta, rice, potato, etc.), dry sauce or marinade mixes, and microwaveable popcorn. These foods are not limited to a particular method of making, as the term covers, for example, both conventional and microwave macaroni & cheese. Additionally, it is not intended that foods be limited to food products for human consumption, as the heat-triggered food colorants may also be incorporated into foods for animal consumption.

In another embodiment, the heat-triggered colorants for foods may comprise a carrier material that includes fragrance. Such fragrance-enhanced heat-triggered colorants may release a burst of fragrance when the heat-triggered colorant melts. Fragrances suitable for the invention include, but are not limited to, essential oils such as d-limonene and aroma chemicals such as cinnamic aldehyde. Food grade d-limonene is available from Florida Chemical Co. (Winter Haven, Fla.) and cinnamic aldehyde is available from International Flavors & Fragrance (New York, N.Y.).

By choosing the appropriate coating and carrier material, it is possible to manufacture heat-triggered colorants that are insoluble in aqueous environments, and do not bleed colors over long periods of exposure to an aqueous environment. As such, it is possible to incorporate heat-triggered colorants into a variety of foodstuffs, including, but not limited to, sauces, juices, creams, pastes, etc., where the colorants may remain hidden until the product is heated.

By appropriately choosing the size and color of the heat-triggered colorant, the heat-triggered colorant will be substantially invisible in the food to which it has been added. Only after an application of heat causes the heat-triggered colorant to melt will the consumer realize that an additional food colorant is present. In some embodiments, the natural color of the coating will mask a first food colorant which has been mixed with the carrier. In other embodiments, a second food colorant may be incorporated into the coating to allow the coating to mask the first food colorant and/or to camouflage the presence of the heat-triggered colorant amidst the color of the food.

In one application, the heat-triggered colorants of the present invention are incorporated into processed food powders, thus providing a color change when the processed food powder is heated. For example, heat-triggered colorants may be added to a powdered cheese mixture that is included in a box of macaroni and cheese. The heat-triggered colorant may have an orange second food colorant in the coating that masks the blue first food colorant which was mixed with the carrier. When a consumer mixes the powdered cheese mixture containing the heat-triggered colorants with the hot macaroni, the cheese sauce will turn blue as the heat-triggered carrier melts, releasing the first food colorant and the carrier material, which are now incorporated into the cheese sauce.

The heat-triggered colorants may also be incorporated into finished food products, such as toaster pastries. The heat-triggered colorants may be placed into the crust of the toaster pastry, or the frosted covering of the toaster pastry. By choosing appropriate coatings, the heat-triggered colorants would be virtually invisible to the consumer, prior to heating the pastry. Upon heating, for example, in a toaster or toaster oven, the heat-triggered carrier would melt, resulting in a color change in the crust or frosted covering of the pastry. If the coating were suitably chosen to mask the color of the first food colorant, the color of the pastry would be different when the pasty emerged from the toaster or toaster oven. It may also be possible to pre-position the heat-triggered colorants in the food product such that words or images appear in the crust or frosted covering of the pastry when the pastry emerges from the toaster or toaster oven.

It is further contemplated that heat-triggered colorants may be used to indicate that foods have been heated sufficiently. For example, heat-triggered colorants may be mixed with processed raw meats such as hamburger. When the interior of a meat patty has reached the correct temperature, a colorant is released. Thus, a consumer either cutting into, or biting into, the cooked meat product will be reassured that the patty was cooked sufficiently to kill harmful bacteria. Such an indicator may be particularly valuable in the fast food industry as an inexpensive indicator of quality control.

Heat-triggered colorants may also be used to indicate that foods have been exposed to temperatures outside of a safe range. For example, heat-triggered colorants containing a colorant could be added to single-serve cartons of milk. If the milk is exposed to temperatures greater than 45° F., for example, the heat-triggered carrier containing the colorant will melt, releasing the colorant. Thus, prior to drinking from the single-serve container, a consumer can visually verify that the product has been exposed to unsafe temperatures, rather than relying on taste or smell.

The following examples are illustrative and are not to be construed as limiting the scope of the invention.

EXAMPLES

Example 1: FD&C Blue No. 1 Aluminum Lake as Internal Colorant

Step 1-125 grams of FD&C Blue No. 1 aluminum lake (Sensient Colors, St. Louis, Mo.) was stirred into 2375 grams of molten Dritex C, a hydrogenated cottonseed wax (AC Humko, Memphis Tenn.) held at 80° C. The mixture was sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres were 200-500 microns in diameter (volume-weighted average).

Step 2—932.8 grams of granular shellac (R-49 NF, Mantrose-Haeuser, Attleboro, Mass.) was added to a mixture of 1910.85 grams of DI water and 1910.85 grams of 30% ammonia solution. The resulting mixture was stirred overnight at 55° C. with an electric mixer using a 1 inch, 6-paddle turbine at 600 R.P.M. to completely dissolve the shellac.

Step 3—180 grams of titanium dioxide was dispersed using a Silverson L2R Laboratory rotor Stator mixer (Silverson Machines, Inc., East Longmeadow, Mass.) at full power for 2 minutes into 1310.1 grams of the solution made in step 2.

Step 4—The dispersion made in step 3 was coated in a FL-M-1 fluid bed coater (Vector Corporation, Marion, Iowa) onto 1000 grams of the wax spheres made in step 1. The titanium dioxide/shellac mixture was fed at 5 grams per minute. The temperature in the coater was 30° C. and the air flow rate was 3 SCFM.

The resulting powder, which appeared white, became blue when exposed to temperatures exceeding 80° C. The particles maintained their white appearance when immersed in water overnight at ambient temperature. There was no detectable bleeding of the colorant into the water after overnight immersion at ambient temperature.

As a proof of principle, 0.5 grams of the resulting coated spheres were blended with one packet of yellow cheese powder sold as microwavable macaroni and cheese (Kraft Foods, Northfield, Ill.). Following the directions on the package, the resulting blend was added, with water, to a bowl of microwavable macaroni noodles and stirred. No blue color was observed in the mixture. The macaroni, water, and cheese were then cooked in a microwave oven for the recommended time. Because the heat from the microwave process released the encapsulated colorants, the macaroni and cheese was blue upon removal from the microwave oven.

Example 2: FD&C Blue No. 1 Dye as Internal Colorant

Step 1—FD&C Blue No. 1 (Sensient Colors, St. Louis, Mo.) was dissolved at 5% in a solution of propylene glycol, mono and di-glycerides and lecithin (all available from Sigma-Aldrich, Milwaukee, Wis.). The resulting mixture was blended at 10% into molten erythritol distearate (Stepan Co., Northfield, Ill.) held at 80° C. The mixture was sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres were 200-500 microns in diameter (volume-weighted average).

Step 2—One kilogram of the beads created in step 1 were coated with a solution containing 1310 grams of a 19.6% shellac solution (R-49 NF, Mantrose-Haeuser, Attleboro, Mass.) and 360 grams of a stable, 50% titanium dioxide dispersion (Sensient 58011 White Dispersion, Sensient Colors, St. Louis, Mo.).

As in Example 1, the beads appeared white, but turned blue when exposed to temperatures exceeding 80° C.

Example 3: Using a Coating Colorant Other than White TiO$_2$

Step 1—125 grams of FD&C Blue No. 1 aluminum lake (Sensient Colors, St. Louis, Mo.) was stirred into 2375 grams of molten, erythritol distearate held at 80° C. The mixture was sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres were 200-500 microns in diameter (volume-weighted average).

Step 2—932.8 grams of granular shellac (R-49 NF, Mantrose-Haeuser, Attleboro, Mass.) was added to a mixture of 1910.85 grams of DI water and 1910.85 grams of 30% ammonia solution. The resulting mixture was gently stirred overnight at 55° C. to completely dissolve the shellac.

Step 3—108 grams of brown pigment dispersion (56177 Brown Dispersion, Sensient Colors, St. Louis, Mo.) and 252 grams of titanium dioxide dispersion (58011 White Dispersion, Sensient Colors, St. Louis, Mo.) were dispersed under high shear into 1310 grams of the solution made in step 2. The dispersing was done using an L2R homogenizer (Silverson Machines, Inc., East Longmeadow, Mass.) at full power for 2 minutes.

Step 4—779 grams of the mixture from step 3 was coated onto 1 kg of the particles from step 1. The coating was completely opaque. Visual inspection determined that that none of the first food colorant (FD&C Blue No. 1 aluminum lake) was visible.

Example 4: Pre-Manufactured Shellac Solution for the Coating

Step 1—125 grams of FD&C Blue No. 1 aluminum lake (Sensient Colors, St. Louis, Mo.) was stirred into 2375 grams of molten, erythritol distearate held at 80° C. The mixture was sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres were 200-500 microns in diameter (volume-weighted average).

Step 2—4312 grams of a pre-made 25% shellac solution (Mantrose-Haeuser, Attleboro, Mass.) was dissolved in 1188 grams of DI water.

Step 3—180 grams of $TiO_2$ was dispersed under high shear into in 1310 grams of the solution from step 2. The dispersing was done using an L2R homogenizer (Silverson Machines, Inc., East Longmeadow, Mass.) at full power for 2 minutes.

Step 4—779 grams of the mixture from step 3 was coated onto 1 kg of the particles from step 1.

The resulting bead was a semi-opaque, in that the coating of step 3 only partially concealed the first food colorant.

Example 5: Anthocyanin Pigment as Internal Colorant

Step 1—A water-in-oil emulsion of anthocyanin color extract from purple carrot (Sensient Colors, St. Louis, Mo.) was produced by emulsifying a water soluble anthocyanin into coconut oil using a low HLB polyglyceryl ester (Stepan Co., Northfield, Ill.). The resulting emulsion was blended at 10% into molten erythritol distearate (Stepan Co., Northfield, Ill.) held at 80° C. The mixture was sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres were 200-500 microns in diameter (volume-weighted average).

Step 2—One kilogram of the beads created in step 1 were coated with a solution containing 1310 grams of a 19.6% shellac solution (R-49 NF, Mantrose-Haeuser, Attleboro, Mass.) and 360 grams of a stable, 50% titanium dioxide dispersion (Sensient 58011 White Dispersion, Sensient Colors, St. Louis, Mo.). The coating was completely opaque. Visual inspection determined that that none of the anthocyanin colorant was visible.

PROPHETIC EXAMPLES

Example 6: Carmine/Cochineal Extract as Internal Colorant

Step 1—Carmine/Cochineal extract (Sensient Colors, St. Louis, Mo.) is dissolved at 5% in a solution of propylene glycol, mono and di-glycerides and lecithin (Sigma-Aldrich, Milwaukee, Wis.). The resulting mixture is blended at 10% into molten erythritol distearate (Stepan Co., Northfield, Ill.) held at 80° C. The mixture is sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres are 200-500 microns in diameter (volume-weighted average).

Step 2—One kilogram of the beads created in step 1 are coated with a solution containing 1310 grams of a 19.6% shellac solution (R-49 NF, Mantrose-Haeuser, Attleboro, Mass.) and 360 grams of a stable, 50% titanium dioxide dispersion (Sensient 58011 White Dispersion, Sensient Colors, St. Louis, Mo.).

The beads produced are expected to appear white, but are expected to turn red when exposed to temperatures exceeding 80° C.

Example 7: Using Aluminum Potassium Sulfate Dodedechydrate (Alum) as the First Food Carrier Material Step 1-125 grams of FD&C Blue No. 1 aluminum lake (Sensient Colors, St. Louis, Mo.) is stirred into 2375 grams of molten alum (melt point 92° C.) (Sigma-Aldrich, St. Louis, Mo.). The mixture is sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres are 200-500 microns in diameter (volume-weighted average).

Step 2—932.8 grams of granular shellac (R-49 NF, Mantrose-Haeuser, Attleboro, Mass.) is added to a mixture of 1910.85 grams of DI water and 1910.85 grams of 30% ammonia solution. The resulting mixture is gently stirred overnight at 55° C. to completely dissolve the shellac.

Step 3—180 grams of titanium dioxide are dispersed under high shear into 1310.1 grams of the solution made in step 2. The dispersing is done using an L2R homogenizer (Silverson Machines, Inc., East Longmeadow, Mass.) at full power for 2 minutes.

Step 4—The dispersion made in step 3 is coated in a FL-M-1 fluid bed coater (Vector Corporation, Marion, Iowa) onto 1000 grams of the alum spheres made in step 1. The titanium dioxide/shellac mixture is fed at 5 grams per minute. The temperature in the coater is 30° C. and the air flow rate is 3 SCFM.

The resulting powder is expected to appear white and become blue when exposed to temperatures greater than 92° C. The powder is expected to maintain its white appearance when immersed in water overnight at ambient temperature.

Example 8: Heat-Triggered Color and Fragrance Releasing Prill

Step 1—125 grams of FD&C Blue No. 1 aluminum lake (Sensient Colors, St. Louis, Mo.) and 0.5 grams of a food grade d-limonene (Florida Chemical Company, Winter Haven, Fla.) are stirred into 2375 grams of molten Dritex C, a hydrogenated cottonseed wax (AC Humko, Memphis Tenn.) held at 80° C. The mixture is sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres are 200-500 microns in diameter (volume-weighted average).

Step 2—932.8 grams of granular shellac (R-49 NF, Mantrose-Haeuser, Attleboro, Mass.) are added to a mixture of 1910.85 grams of DI water and 1910.85 grams of 30% ammonia solution. The resulting mixture is gently stirred overnight at 55° C. to completely dissolve the shellac.

Step 3—180 grams of titanium dioxide is dispersed under high shear into 1310.1 grams of the solution made in step 2. The dispersing is done using an L2R homogenizer (Silverson Machines, Inc., East Longmeadow, Mass.) at full power for 2 minutes.

Step 4—The dispersion made in step 3 is coated in a FL-M-1 fluid bed coater (Vector Corporation, Marion, Iowa) onto 1000 grams of the fragrance-containing wax spheres made in step 1. The titanium dioxide/shellac mixture is fed at 5 grams per minute. The temperature in the coater is 30° C. and the air flow rate is 3 SCFM.

The resulting powder is expected to appear white and become blue and release a fragrant burst when exposed to temperatures greater than 80° C. The powder is expected to maintain its white appearance when immersed in water overnight at ambient temperature.

Example 9: Fragrance Releasing Coating

Step 1—125 grams of FD&C Blue No. 1 aluminum lake (Sensient Colors, St. Louis, Mo.) is stirred into 2375 grams of molten Dritex C, a hydrogenated cottonseed wax (AC Humko, Memphis Tenn.) held at 80° C. The mixture is sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres are 200-500 microns in diameter (volume-weighted average).

Step 2—932.8 grams of granular shellac (R-49 NF, Mantrose-Haeuser, Attleboro, Mass.) are added to a mixture of 1910.85 grams of DI water and 1910.85 grams of 30% ammonia solution. The resulting mixture is gently stirred overnight at 55° C. to completely dissolve the shellac.

Step 3—180 grams of titanium dioxide and 0.5 grams of a food grade d-limonene (Florida Chemical Company, Winter Haven, Fla.) is dispersed under high shear into 1310.1 grams of the solution made in step 2. The dispersing is done using an L2R homogenizer (Silverson Machines, Inc., East Longmeadow, Mass.) at full power for 2 minutes.

Step 4—The dispersion made in step 3 is coated in a FL-M-1 fluid bed coater (Vector Corporation, Marion, Iowa) onto 1000 grams of the fragrance-containing wax spheres made in step 1. The titanium dioxide/shellac mixture is fed at 5 grams per minute. The temperature in the coater is 30° C. and the air flow rate is 3 SCFM.

The resulting powder is expected to appear white and become blue and release a fragrance burst when exposed to temperatures exceeding 80° C. The powder is expected to maintain its white appearance when immersed in water overnight at ambient temperature.

Example 10: Heat-Triggered Color and Flavor Releasing Particle

Step 1—125 grams of FD&C Blue No. 1 aluminum lake (Sensient Colors, St. Louis, Mo.) and 0.5 grams of food grade almond flavor oil (Nature's Flavors, Orange, Calif.) are stirred into 2375 grams of molten Dritex C, a hydrogenated cottonseed wax (AC Humko, Memphis Tenn.) held at 80° C. The mixture is sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres are 200-500 microns in diameter (volume-weighted average).

Step 2—932.8 grams of granular shellac (R-49 NF, Mantrose-Haeuser, Attleboro, Mass.) is added to a mixture of 1910.85 grams of DI water and 1910.85 grams of 30% ammonia solution. The resulting mixture is gently stirred overnight at 55° C. to completely dissolve the shellac.

Step 3—180 grams of titanium dioxide are dispersed under high shear into 1310.1 grams of the solution made in step 2. The dispersing is done using an L2R homogenizer (Silverson Machines, Inc., East Longmeadow, Mass.) at full power for 2 minutes.

Step 4—The dispersion made in step 3 is coated in a FL-M-1 fluid bed coater (Vector Corporation, Marion, Iowa) onto 1000 grams of the flavor containing wax spheres made in step 1. The titanium dioxide/shellac mixture is fed at 5 grams per minute. The temperature in the coater is 30° C. and the air flow rate is 3 SCFM.

The resulting powder is expected to appear white and become blue when exposed to temperatures exceeding 80° C. The powder is expected to maintain its white appearance when immersed in water overnight at ambient temperature. It is expected that taste tests will indicate that the food has an almond flavor after heating.

Example 11: Flavor Releasing Coating

Step 1—125 grams of FD&C Blue No. 1 aluminum lake (Sensient Colors, St. Louis, Mo.) is stirred into 2375 grams of molten Dritex C, a hydrogenated cottonseed wax (AC Humko, Memphis Tenn.) held at 80° C. The mixture is sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres are 200-500 microns in diameter (volume-weighted average).

Step 2—932.8 grams of granular shellac (R-49 NF, Mantrose-Haeuser, Attleboro, Mass.) is added to a mixture of 1910.85 grams of DI water and 1910.85 grams of 30% ammonia solution. The resulting mixture is gently stirred overnight at 55° C. to completely dissolve the shellac.

Step 3—180 grams of titanium dioxide and 0.5 grams of food grade almond flavor oil (Nature's Flavors, Orange, Calif.) are dispersed under high shear into 1310.1 grams of the solution made in step 2. The dispersing is done using an L2R homogenizer (Silverson Machines, Inc., East Longmeadow, Mass.) at full power for 2 minutes.

Step 4—The dispersion made in step 3 is coated in a FL-M-1 fluid bed coater (Vector Corporation, Marion, Iowa) onto 1000 grams of the flavor containing wax spheres made in step 1. The titanium dioxide/shellac mixture is fed at 5 grams per minute. The temperature in the coater is 30° C. and the air flow rate is 3 SCFM.

The resulting powder is expected to appear white and become blue when exposed to temperatures exceeding 80° C. The powder is expected to maintain its white appearance when immersed in water overnight at ambient temperature. Taste tests are expected to indicate that the food has an almond flavor after heating.

Example 12: Alternative Particle Construction using Aluminum Lake for the Second Food Colorant Step 1—2375 grams of Dritex C, a hydrogenated cottonseed wax (AC Humko, Memphis Tenn.) are held at 80° C. The wax is sprayed at 15 psi through an atomizing nozzle (Uni-jet Standard Spray, D-Type, Disk and Core Hollow Cone Nozzle with a D6 cap and a size 28 swirl insert, Spraying Systems Inc., Wheaton, Ill.). The resulting solid spheres are 200-500 microns in diameter (volume-weighted average).

Step 2—932.8 grams of granular shellac (R-49 NF, Mantrose-Haeuser, Attleboro, Mass.) are added to a mixture of 1910.85 grams of DI water and 1910.85 grams of 30% ammonia solution. The resulting mixture is gently stirred overnight at 55° C. to completely dissolve the shellac. To this mixture 125 g of FD&C Blue No. 1 aluminum lake is dispersed.

Step 3—The dispersion made in step 2 is coated in a FL-M-1 fluid bed coater (Vector Corporation, Marion, Iowa) onto 1000 grams of the wax spheres made in step 1. The blue lake/shellac mixture is fed at 5 grams per minute. The wax particles are then coated, forming a blue shell around the wax core.

Step 4—180 grams of titanium dioxide are dispersed under high shear into 1310.1 grams of another prepared shellac solution as described in 2. The dispersing is done using an L2R homogenizer (Silverson Machines, Inc., East Longmeadow, Mass.) at full power for 2 minutes.

Step 5—The dispersion made in step 4 is coated in a FL-M-1 fluid bed coater (Vector Corporation, Marion, Iowa) onto 1000 grams of the blue shell coated wax spheres made in step 3. The titanium dioxide/shellac mixture is fed at 5 grams per minute. The temperature in the coater is 30° C. and the air flow rate is 3 SCFM.

The resulting powder, which is expected to appear white, is expected to become blue when exposed to temperatures exceeding 80° C.

Example 13: Aluminum Lake Colorant with Water Soluble Core

Step 1—125 g FD&C Blue No. 1 aluminum lake (Sensient Colors, St. Louis, Mo.) is stirred into 2375 grams of molten sugar. The molten sugar mixture is sprayed under pressure to form droplets which cool, resulting in solid spheres 200-500 microns in diameter (volume-weighted average).

Step 2—932.8 grams of granular shellac (R-49 NF, Mantrose-Haeuser, Attleboro, Mass.) is added to a mixture of 1910.85 grams of DI water and 1910.85 grams of 30% ammonia solution. The resulting mixture is gently stirred overnight at 55° C. to completely dissolve the shellac.

Step 3—180 grams of titanium dioxide is dispersed under high shear into 1310.1 grams of the solution made in step 2. The dispersing is done using an L2R homogenizer (Silverson Machines, Inc., East Longmeadow, Mass.) at full power for 2 minutes.

Step 4—The dispersion made in step 3 is coated in a FL-M-1 fluid bed coater (Vector Corporation, Marion, Iowa) onto 1000 grams of the blue sugar spheres made in step 1. The titanium dioxide/shellac mixture is fed at 5 grams per minute. The temperature in the coater is 30° C. and the air flow rate is 3 SCFM.

The resulting powder, which is expected to appear white, is expected to turn blue when exposed to water or when exposed to high temperatures.

Example 14: Toaster Pastry with Heat-Triggered Colorants

One gram of the heat-triggered colorants of Example 1 are incorporated into 15 grams of white frosting which is applied to the top of a KELLOGS POP-TART. Because the heat triggered colorants are white, there is no evidence that the frosting layer contains any additional components.

The KELLOGS POP-TART with heat-triggered colorants is placed into a Sunbeam Electric Toaster (Jarden Corporation, Rye, N.Y.), with the toast setting at "MED," and the button is depressed. When the heating cycle is complete, the toaster elevates the cooked KELLOGS POP-TART with heat-triggered colorants. The frosting layer that had been applied to the top of the POP-TART is now blue.

The heat triggered colorants of Example 1 may be replaced with any of the heat-triggered colorants from Examples 2-12 to achieve a similar effect in KELLOGS POP-TARTS. The resultant frosting color will vary based upon the food colorants used in the heat triggered colorants.

Example 15: Refrigerated Cookie Dough with Heat-Triggered Colorants 0.25 gm of heat triggered colorants of Example 3 are incorporated into 25 grams of refrigerated sugar cookie dough (General Mills, Minneapolis, Minn.). Because the heat triggered colorants are brown, there is no evidence that the refrigerated sugar cookie dough contains any additional components.

The heat triggered colorants are kneaded into the sugar cookie dough. The sugar cookie dough containing heat-triggered colorants is then baked in the oven according to product instructions (350° F. for 10 minutes). When the heating cycle is complete, it is expected that blue specks of color will be visually apparent in the sugar cookie.

The heat triggered colorants of Example 3 may be replaced with any of the heat-triggered colorants from Examples 1-2 and 4-12 to achieve a similar effect in sugar cookie dough. The resultant cookie color will vary based upon the food colorants used in the heat-triggered colorants.

Example 16: Microwave Oatmeal with Heat Triggered Colorants Containing FD&C Blue No. 1

2.0 grams of the heat triggered colorants of Example 1 are incorporated into one package (54 grams) of microwaveable oatmeal (The Quaker Oats Co, Chicago, Ill.). Because the heat triggered colorants are white and the particle size is small, there is no evidence that the oatmeal contains any additional components.

The microwaveable oatmeal containing the heat-triggered colorants is then prepared according to product instructions (add water to marked line in cup, microwave for 1 minute-1 minute 15 seconds). When the heating cycle is complete, the oatmeal appears blue.

The heat triggered colorants of Example 1 may be replaced with any of the heat-triggered colorants from Examples 2-12 to achieve a similar effect in microwaveable oatmeal. The resultant microwaveable oatmeal color will vary based upon the food colorants used in the heat-triggered colorants.

Example 17: Microwave Oatmeal with Heat Triggered Colorants Containing Anthocyanin Pigment 2.0 grams of the heat triggered colorants of Example 5 are incorporated into one package (54 grams) of microwaveable oatmeal (The Quaker Oats Co, Chicago, Ill.). Because the heat triggered colorants are white and the particle size is small, there is no evidence that the oatmeal contains any additional components.

The microwaveable oatmeal containing the heat-triggered colorants is then prepared according to product instructions (add water to marked line in cup, microwave for 1 minute-1 minute 15 seconds). When the heating cycle is complete, the oatmeal appears purple.

Example 18: Microwave Macaroni & Cheese with Heat-Triggered Colorants 2.0 gm of heat triggered colorants of Example 1 are incorporated into one packet (14.3 grams) of microwaveable macaroni & cheese seasoning mix (Kraft Foods, Northfield, Ill.). Because the heat triggered colorants are white and the particle size is small, there is no evidence that the oatmeal contains any additional components.

The heat triggered colorants are blended into the dry seasoning. The noodles are then prepared according to product instructions (add water to marked line in cup, and microwave 1 minute-1 minute 15 seconds). When the heating cycle is complete, the seasoning mix containing the heat-triggered colorants is added to the noodles, according to package instructions. The resulting macaroni and cheese is expected to have a blue, to blue-green shade.

The heat triggered colorants of Example 1 may be replaced with any of the heat-triggered colorants from Examples 2-12 to achieve a similar effect in microwaveable macaroni & cheese. The resultant microwaveable macaroni & cheese color will vary based upon the food colorants used in the heat-triggered colorants.

All patents, publications and references cited herein are hereby fully incorporated by reference. In case of conflict between the present disclosure and incorporated patents, publications and references, the present disclosure should control.

Thus, the invention provides, among other things, a heat-triggered colorant comprising a first food colorant, a meltable carrier, and a coating, as well as methods of using and making the heat-triggered colorants. Various features and advantages of the invention are set forth in the following claims.

What is claimed is:

1. A heat-triggered colorant for foods, the heat-triggered colorant comprising:
    a mixture comprising a carrier having a melting point of less than about 100° C. and a GRAS (Generally Recognized as Safe) first food colorant having a first color; and
    an opaque coating encapsulating the mixture, the coating containing a second food colorant having a second color,
    wherein the heat-triggered colorant is a particle, wherein the particle is about 100 to 500 microns in diameter,
    wherein the heat-triggered colorant is insoluble in an aqueous environment, and
    wherein when the heat-triggered colorant is exposed to a temperature greater than the melting point of the carrier, the carrier melts and releases the first food colorant.

2. The heat-triggered colorant of claim 1, wherein the coating has a melting point that is substantially the same as or greater than the melting point of the carrier.

3. The heat-triggered colorant of claim 1, wherein the melting point of the carrier is greater than about 80° C. and less than about 100° C.

4. The heat-triggered colorant of claim 1, wherein the GRAS first food colorant comprises at least one of FD&C Blue No. 1, FD&C Blue No. 2, FD&C Green No. 3, FD&C Red No. 40, FD&C Red No. 3, FD&C Yellow No. 5, FD&C Yellow No. 6, and combinations thereof.

5. The heat-triggered colorant of claim 1, wherein the GRAS first food colorant comprises at least one of caramel coloring, annatto, copper chlorophyllin, carmine/cochineal extract, beet juice, saffron, turmeric, beta carotene, black carrot, fruit juices, vegetable juices, paprika oleoresin, and combinations thereof.

6. The heat-triggered colorant of claim 1, wherein the carrier comprises erythritol distearate or hydrogenated cottonseed wax.

7. The heat-triggered colorant of claim 1, wherein the coating comprises at least one of shellac, ethyl cellulose, zein, starch, and combinations thereof.

8. The heat-triggered colorant of claim 1, wherein the second food color is different from the first color, and wherein after being exposed to the temperature, the first and second food colorants contact one another and form a third color different from the first and second colors.

9. The heat-triggered colorant of claim 1, further comprising at least one of a flavoring, a fragrance and a combination thereof.

10. A food comprising the heat triggered colorant of claim 1.

11. The heat-triggered colorant of claim 1, wherein the mixture has an average particle size larger than about 100 microns.

12. A heat-triggered colorant for foods, the heat-triggered colorant comprising:
    a mixture comprising a carrier having a melting point of less than about 100° C. and a GRAS (Generally Recognized as Safe) first food colorant having a first color; and
    an opaque coating containing a second food colorant having a second color, having a melting point of less than about 100° C., and encapsulating the mixture,
    wherein the heat-triggered colorant is a particle, wherein the particle is about 100 to 500 microns in diameter,
    wherein the heat-triggered colorant is insoluble in an aqueous environment, and
    wherein when the heat-triggered colorant is exposed to a temperature greater than the melting point of the coating, the coating melts.

13. The heat-triggered colorant of claim 12, wherein the heat-triggered colorant is about 100 to 500 microns in diameter.

14. The heat-triggered colorant of claim 12, wherein the melting point of the carrier is greater than the melting point of the coating.

15. The heat-triggered colorant of claim 12, wherein the melting point of the coating is greater than at least about 80° C. and less than about 100° C.

16. The heat-triggered colorant of claim 12, wherein the GRAS first food colorant comprises at least one of FD&C Blue No. 1, FD&C Blue No. 2, FD&C Green No. 3, FD&C Red No. 40, FD&C Red No. 3, FD&C Yellow No. 5, FD&C Yellow No. 6, and combinations thereof.

17. The heat-triggered colorant of claim 12, wherein the GRAS first food colorant comprises at least one of caramel coloring, annatto, copper chlorophyllin, carmine/cochineal extract, beet juice, saffron, turmeric, beta carotene, black carrot, fruit juices, vegetable juices, paprika oleoresin, and combinations thereof.

18. The heat-triggered colorant of claim 12, wherein the carrier comprises erythritol distearate or hydrogenated cottonseed wax.

19. The heat-triggered colorant of claim 12, wherein the second food color is different from the first color, and wherein after being exposed to the temperature, the first and second food colorants contact one another and form a third color different from the first and second colors.

20. The heat-triggered colorant of claim 12, further comprising at least one of a flavoring, a fragrance and a combination thereof.

21. A food comprising the heat triggered colorant of claim 12.

22. The heat-triggered colorant of claim 12, wherein the mixture has an average particle size larger than about 100 microns.

23. A method of changing a color of a food, the method comprising:
    incorporating the heat-triggered colorant of claim 1 into a food, such that when the heat-triggered colorant is exposed to a temperature greater than the melting point of the carrier, the carrier melts and the coating collapses, releasing the first food colorant and changing the color of the food.

24. The method of claim 23, wherein the food is selected from the group consisting of candy, baked goods, toaster foods, and microwaveable foods.

25. The method of claim 23, wherein the coating contains a second food colorant having a second color.

26. The method of claim 25, wherein the second food color is different from the first color, and wherein after exposing the food to a temperature, the first and second food colorants contact one another and form a third color different from the first and second colors.

27. A method of changing a color of a food, the method comprising:
   incorporating the heat-triggered colorant of claim 12 into a food, such that when the heat-triggered colorant is exposed to a temperature greater than the melting point of the coating, the coating melts, releasing the first food colorant and changing the color of the food.

28. The method of claim 27, wherein the food is selected from the group consisting of candy, baked goods, toaster foods, and microwaveable foods.

29. The method of claim 27, wherein the coating contains a second food colorant having a second color.

30. The method of claim 29, wherein the second food color is different from the first color, and wherein after exposing the food to a temperature, the first and second food colorants contact one another and form a third color different from the first and second colors.

* * * * *